US012654045B2

(12) United States Patent　　　　(10) Patent No.:　US 12,654,045 B2
　　　Faber　　　　　　　　　　　　(45) Date of Patent:　　Jun. 16, 2026

---

(54) CABLE SLEEVE

(71) Applicant: Pure Safety Group, Inc., Pasadena, TX (US)

(72) Inventor: Warren L. Faber, Bonney Lake, WA (US)

(73) Assignee: Pure Safety Group, Inc., Pasadena, TX (US)

( * ) Notice: Subject to any disclaimer, the term of this patent is extended or adjusted under 35 U.S.C. 154(b) by 670 days.

(21) Appl. No.: 17/981,794

(22) Filed: Nov. 7, 2022

(65) Prior Publication Data

US 2023/0158348 A1　　　May 25, 2023

Related U.S. Application Data

(60) Provisional application No. 63/281,245, filed on Nov. 19, 2021.

(51) Int. Cl.
　　*A62B 35/00*　　　　(2006.01)
　　*A62B 35/04*　　　　(2006.01)
　　*F16D 63/00*　　　　(2006.01)
(52) U.S. Cl.
　　CPC .......... *A62B 35/0081* (2013.01); *A62B 35/04* (2013.01); *F16D 63/008* (2013.01)
(58) Field of Classification Search
　　CPC .......... F16D 63/008; F16B 2/18; F16B 2/185; Y10T 24/3944; A62B 1/14;
　　　　　　　　(Continued)

(56) References Cited

U.S. PATENT DOCUMENTS 5,265,696 A　　11/1993　Casebolt
5,323,873 A　　　6/1994　Pelofi
　　　　　　(Continued)

FOREIGN PATENT DOCUMENTS

DE　　202005011338 U1　　11/2006
DE　　102010063600 A1　　　6/2012
　　　　　　(Continued)

OTHER PUBLICATIONS

Sperian Fall Protection, Inc., Miller by Sperian, Vi-Go Cable Sleeves User Instruction Manual, Published Oct. 22, 2008, 16 pages.

(Continued)

*Primary Examiner* — Robert A. Siconolfi
*Assistant Examiner* — San M Aung
(74) *Attorney, Agent, or Firm* — Dicke, Billig & Czaja, PLLC

(57)　　　　　　ABSTRACT

A cable sleeve comprises a housing, a locking cam, and a locking pawl. The housing has an elongate member passage configured to slidably receive an elongate member and has a cavity. The locking cam and the locking pawl are pivotally connected to the housing within the cavity. The locking cam has a radial edge with a constant radius relative to a pivot connection between the locking cam and the housing and is configured to move from a first cam position to a second cam position configured to engage the elongate member in the elongate member passage with the radial edge. The locking pawl is configured to move from a first pawl position to a second pawl position configured to move the locking cam into the second cam position to engage the elongate member.

18 Claims, 23 Drawing Sheets

(58) Field of Classification Search

CPC .............. A62B 35/0037; A62B 35/005; A62B 35/0081; A62B 35/04; A62B 35/18185

USPC ........................................................ 188/65.1

See application file for complete search history.

(56) References Cited

U.S. PATENT DOCUMENTS

| | | | |
|---|---|---|---|
| 5,638,919 | A | 6/1997 | Pejout |
| 5,920,963 | A | 7/1999 | Chou |
| 6,009,977 | A | 1/2000 | Pelofi |
| 6,457,556 | B1 | 10/2002 | Skade et al. |
| 7,845,467 | B2 * | 12/2010 | Petzl ........................ A62B 1/14 |
| | | | 182/71 |
| 8,225,905 | B2 | 7/2012 | Delaittre et al. |
| 8,550,225 | B2 | 10/2013 | Blomberg et al. |
| 8,584,797 | B2 | 11/2013 | Krauss |
| D710,678 | S | 8/2014 | Miller |
| D710,679 | S | 8/2014 | Miller |
| D722,487 | S | 2/2015 | Miller |
| D739,212 | S | 9/2015 | Miller |
| 9,132,297 | B2 | 9/2015 | Casebolt et al. |
| 9,168,402 | B2 * | 10/2015 | Casebolt .............. A62B 35/005 |
| 9,192,792 | B2 | 11/2015 | Moine et al. |
| D746,125 | S | 12/2015 | Miller |
| 9,289,634 | B2 | 3/2016 | Chabod |
| D764,258 | S | 8/2016 | Miller |
| 9,482,251 | B2 | 11/2016 | Moine et al. |
| 9,636,528 | B2 | 5/2017 | Casebolt et al. |
| 9,884,209 | B2 | 2/2018 | Hwang |
| 2002/0014370 | A1 | 2/2002 | Casebolt et al. |
| 2007/0119653 | A1 | 5/2007 | Brown et al. |
| 2010/0032239 | A1 * | 2/2010 | Rinklake ................ E06C 7/186 |
| | | | 188/65.1 |
| 2010/0126802 | A1 | 5/2010 | Delaittre et al. |
| 2011/0186388 | A1 | 8/2011 | Sudale et al. |
| 2014/0020983 | A1 | 1/2014 | Casebolt et al. |
| 2014/0020988 | A1 * | 1/2014 | Casebolt ................ A62B 35/04 |
| | | | 188/65.1 |
| 2014/0284150 | A1 | 9/2014 | Chantelois et al. |
| 2015/0114752 | A1 | 4/2015 | Bornack |
| 2017/0106216 | A1 | 4/2017 | Ollivier |
| 2020/0346671 | A1 | 11/2020 | Sulc et al. |
| 2021/0128955 | A1 | 5/2021 | Marak et al. |
| 2021/0220680 | A1 | 7/2021 | Novotny et al. |
| 2021/0299490 | A1 | 9/2021 | Sulc et al. |
| 2022/0331626 | A1 | 10/2022 | Novotny et al. |

FOREIGN PATENT DOCUMENTS

| | | | |
|---|---|---|---|
| DE | 102012207223 | B3 | 9/2013 |
| DE | 102015114825 | A1 | 3/2017 |
| DE | 202017101379 | U1 | 6/2017 |
| EP | 0168021 | B1 | 12/1987 |
| EP | 1228785 | A1 | 8/2002 |
| EP | 1067992 | B1 | 11/2003 |
| EP | 2200702 | B1 | 2/2011 |
| EP | 2191870 | B1 | 8/2011 |
| EP | 1680192 | B1 | 6/2012 |
| EP | 2754465 | A1 | 7/2014 |
| EP | 2754466 | A1 | 7/2014 |
| EP | 2756868 | B1 | 9/2015 |
| EP | 2663369 | B1 | 4/2016 |
| EP | 2665524 | B1 | 6/2016 |
| EP | 3064253 | A1 | 9/2016 |
| EP | 2643257 | B1 | 5/2017 |
| EP | 3626311 | A1 | 3/2020 |
| FR | 2970183 | B1 | 1/2011 |
| FR | 3022232 | A1 | 12/2015 |
| FR | 3033252 | B1 | 2/2018 |
| GB | 2389386 | B | 11/2005 |
| GB | 2416386 | A | 1/2006 |
| JP | 2001017558 | A | 1/2001 |
| NO | 2017030558 | A1 | 2/2017 |
| WO | 2009037173 | A1 | 3/2009 |
| WO | 2012098199 | A2 | 7/2012 |
| WO | 2013164366 | A2 | 11/2013 |
| WO | 2015074105 | A1 | 5/2015 |
| WO | 2016093850 | A1 | 6/2016 |
| WO | 2016150703 | A1 | 9/2016 |
| WO | 2017135818 | A1 | 8/2017 |
| WO | 2017164857 | A1 | 9/2017 |

OTHER PUBLICATIONS

Alan Grant Lance Silva, "The Development of a New Multi-Directional Fall Arrest Device", University of Southern Queensland Faculty of Engineering and Surveying, Oct. 25, 2005, 94 pages.

DBI Sala—LAD-SAF X3 Detachable Cable Sleeve product screenshot from http://www.dbifallprotection.com/index.cfm?fuseaction=product, display&product_ID=217, 2018, 5 pages.

Protecta, Capital Safety Group EMEA, Cabloc Pro attachment device product user manual, Nov. 26, 2012, 2 pages.

International Search Report and Written Opinion from PCT/GB2022/052922; Feb. 14, 2023; 13 pages; Bob Verboom.

* cited by examiner

CABLE SLEEVE

CROSS-REFERENCE TO RELATED APPLICATIONS

This application claims the benefit of U.S. Provisional Patent Application Ser. No. 63/281,245, filed Nov. 19, 2021, which is incorporated by reference in its entirety herein.

BACKGROUND

Fall protection equipment is commonly used to reduce a likelihood of a fall and/or serious injuries associated with a fall, particularly by users who perform tasks at heights or are at risk of falling. Generally, lifelines or lanyards typically interconnect anchorage structures and safety harnesses donned by users. The lifelines or lanyards allow the users to move and perform tasks while being connected to the anchorage structures. Should a user fall, the fall protection equipment limits the distance the user falls.

A user climbing up and down a vertical structure, such as a ladder or a tower, typically utilizes a vertical fall arrest system as an anchorage structure. An example vertical fall arrest system includes a rope or a cable along which a rope or cable sleeve travels as the user moves along the vertical structure. Should a fall occur, the sleeve locks onto the rope or cable. However, if the user panics and grabs the sleeve, preventing it from locking onto the rope or cable, it is desirable to have a supplemental locking feature (an anti-panic feature).

For the reasons stated above and for other reasons stated below, which will become apparent to those skilled in the art upon reading and understanding the present specification, there is a need in the art for a cable sleeve.

SUMMARY

The above-mentioned problems associated with prior devices are addressed by embodiments of the disclosure and will be understood by reading and understanding the present specification. The following summary is made by way of example and not by way of limitation. It is merely provided to aid in understanding some of the aspects of the invention.

In one embodiment, a cable sleeve comprises a housing, a locking cam, and a locking pawl. The housing has a cavity and an elongate member passage in fluid communication. The elongate member passage is configured and arranged to slidably receive an elongate member. The locking cam is pivotally connected to the housing within the cavity. The locking cam has a radial edge with a constant radius relative to a pivot connection between the locking cam and the housing. The locking cam is configured and arranged to move from a first cam position to a second cam position. The second cam position is configured and arranged to engage the elongate member received in the elongate member passage with the radial edge. The locking pawl is pivotally connected to the housing within the cavity. The locking pawl is configured and arranged to move from a first pawl position to a second pawl position. The second pawl position is configured and arranged to move the locking cam into the second cam position to engage the elongate member received in the elongate member passage.

In one embodiment, a cable sleeve comprises a housing, a locking cam, and a locking pawl. The housing has a cavity and an elongate member passage in fluid communication. The elongate member passage is configured and arranged to slidably receive an elongate member. The locking cam is pivotally connected to the housing within the cavity and is configured and arranged to move from a first cam position to a second cam position. The second cam position is configured and arranged to engage the elongate member received in the elongate member passage with a radial edge. The locking pawl is pivotally connected to the housing within the cavity and is configured and arranged to move from a first pawl position to a second pawl position. The locking pawl has a weighted side configured and arranged to keep the locking pawl in the first pawl position during normal use, and the second pawl position is configured and arranged to engage the locking cam and move the locking cam toward the elongate member passage against the elongate member during a fall event.

In one embodiment, a cable sleeve comprises a housing, a locking cam, a passive locking mechanism, and an active locking mechanism. The housing has a cavity and an elongate member passage in fluid communication. The elongate member passage is configured and arranged to slidably receive an elongate member. The locking cam is pivotally connected to the housing within the cavity and is configured and arranged to move from a first cam position to a second cam position. The second cam position is configured and arranged to engage the elongate member received in the elongate member passage with a radial edge. The passive locking mechanism comprises a locking pawl pivotally connected to the housing within the cavity. The locking pawl is configured and arranged to move from a first pawl position to a second pawl position. The locking pawl has a weighted side configured and arranged to keep the locking pawl in the first pawl position during normal use. The second pawl position is configured and arranged to engage the locking cam and move the locking cam toward the elongate member passage against the elongate member during a fall event. The active locking mechanism comprises a locking arm pivotally connected to the housing. The locking arm has a first end configured and arranged to be coupled to a safety harness and a second end configured and arranged to selectively engage the locking cam. The locking arm has a first arm position and a second arm position. The second arm position is configured and arranged to engage the locking cam and move the locking cam into the second cam position to engage the elongate member received in the elongate member passage. The locking cam engages the elongate member when at least one of the locking pawl and the locking arm engages the locking cam.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. In accordance with common practice, the various described features are not drawn to scale but are drawn to emphasize specific features relevant to the present disclosure. Reference characters denote like elements throughout the Figures and the text.

3

Figure 1:
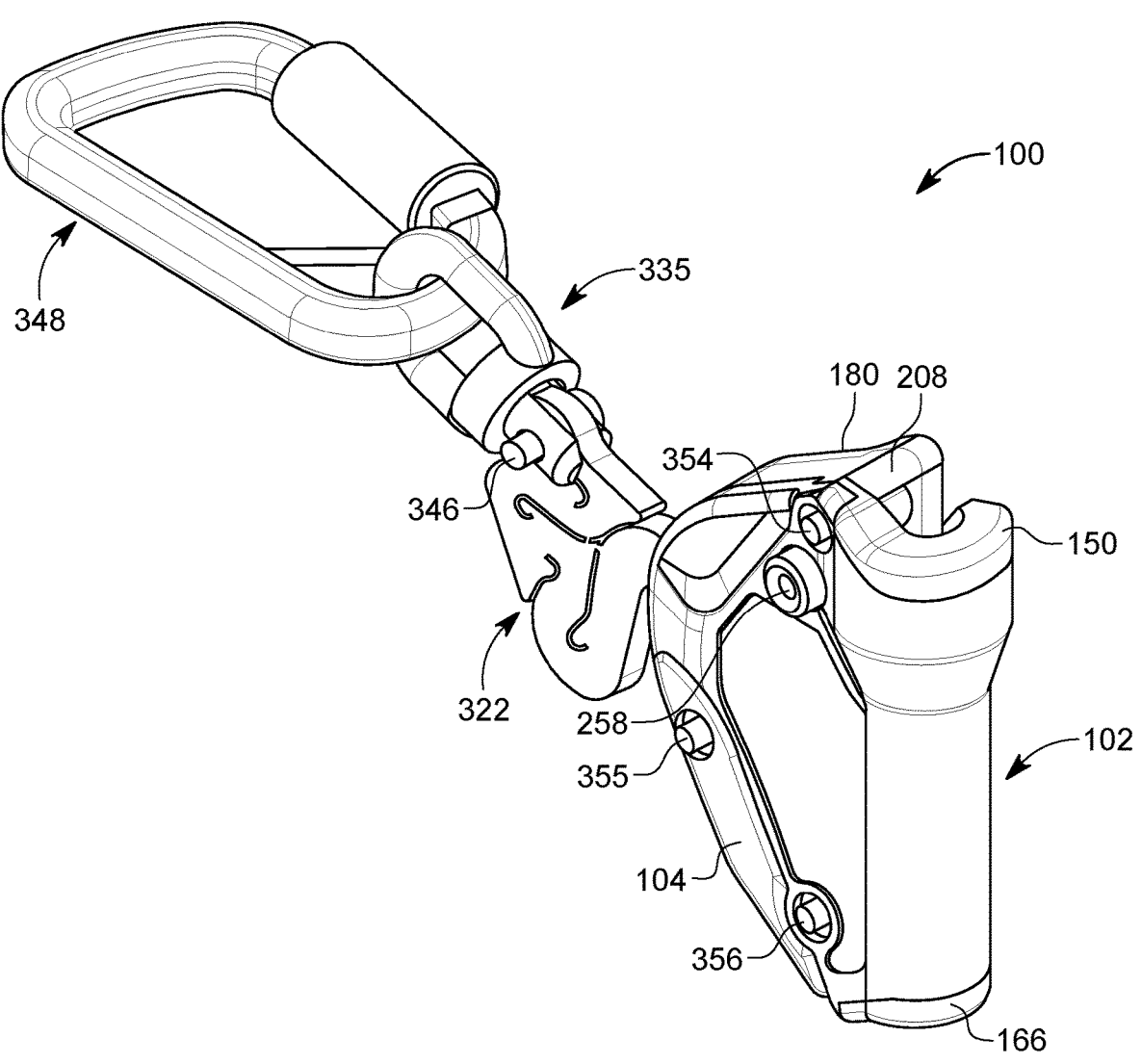
FIG. 1 is a perspective view of an embodiment cable sleeve constructed in accordance with the principles of the present invention connected to a swivel connector and a carabiner.
Figure 2:
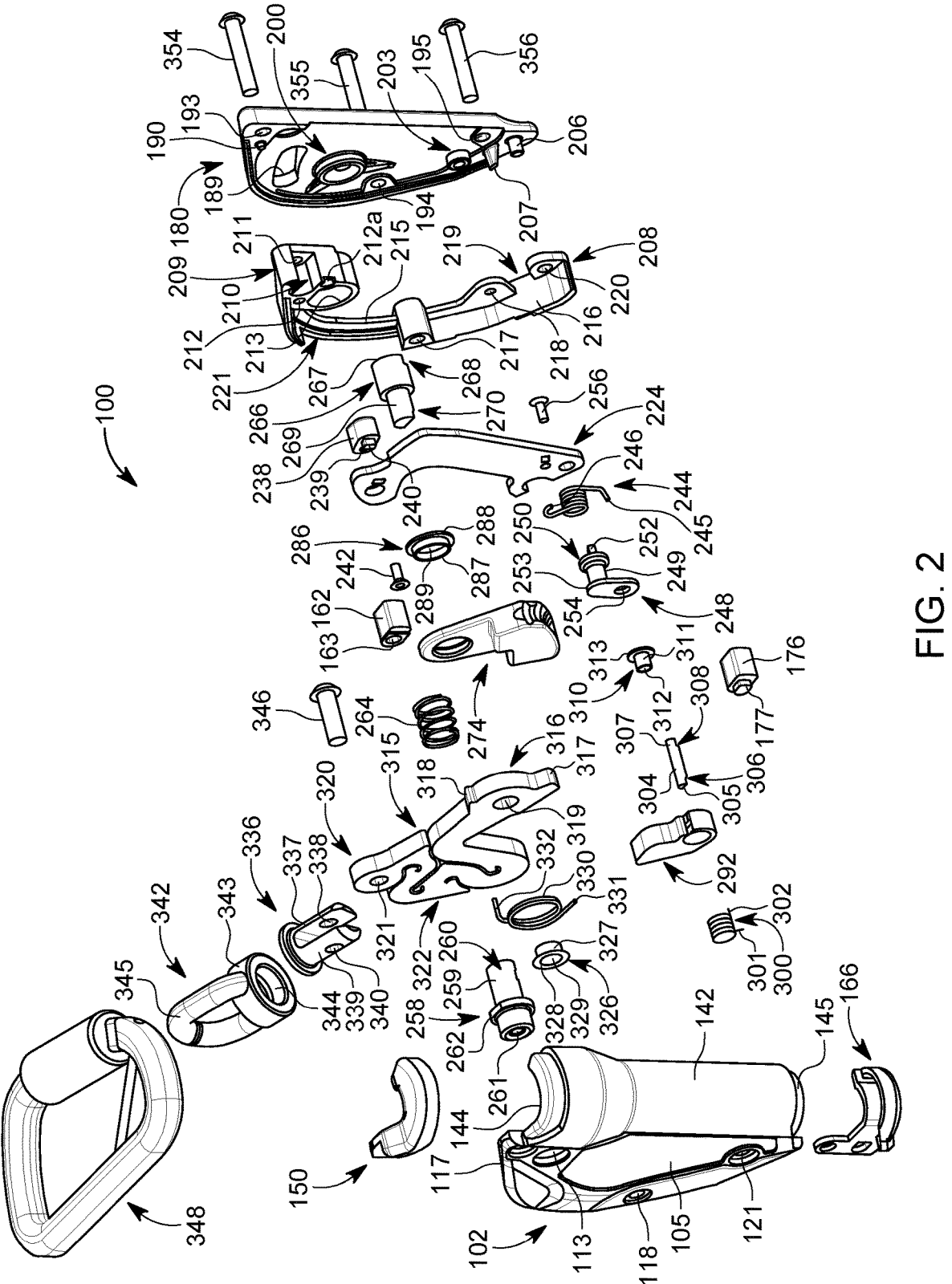
Figure 3:
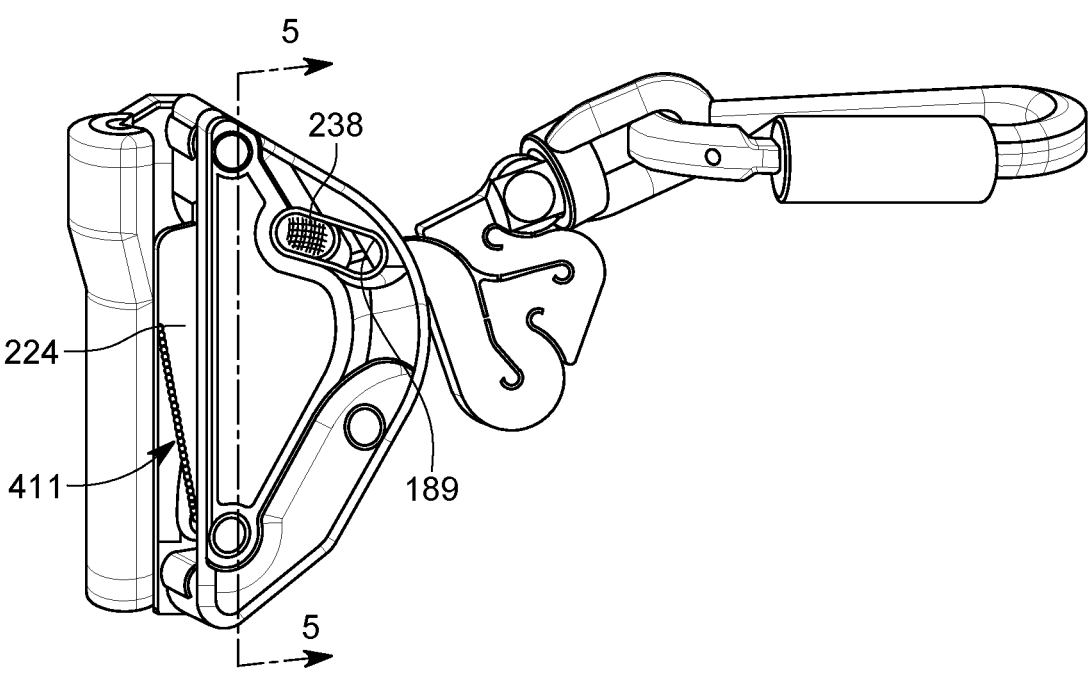
Figure 4:
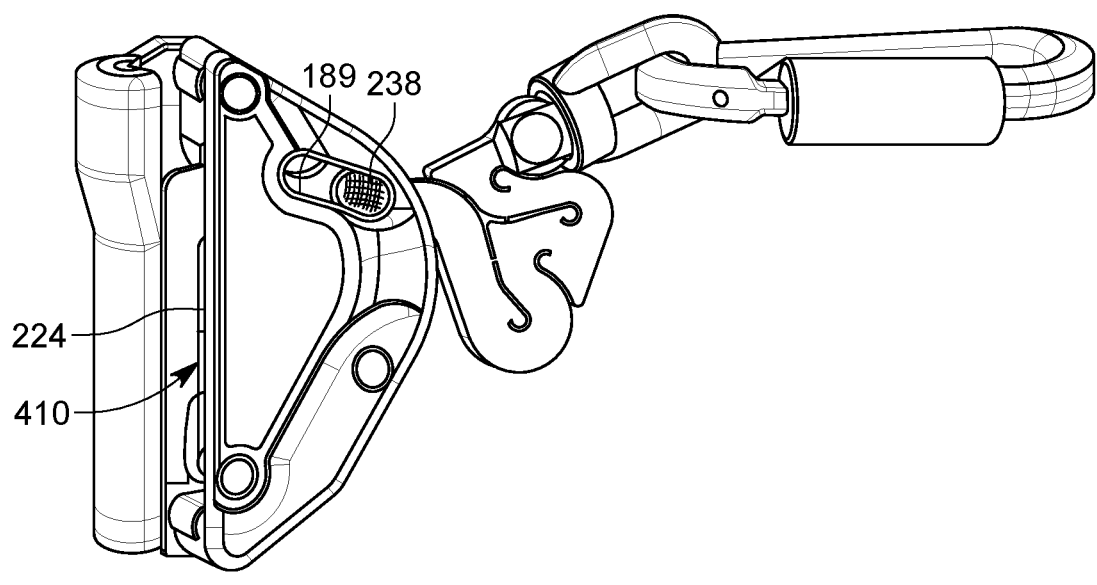
Figure 5:
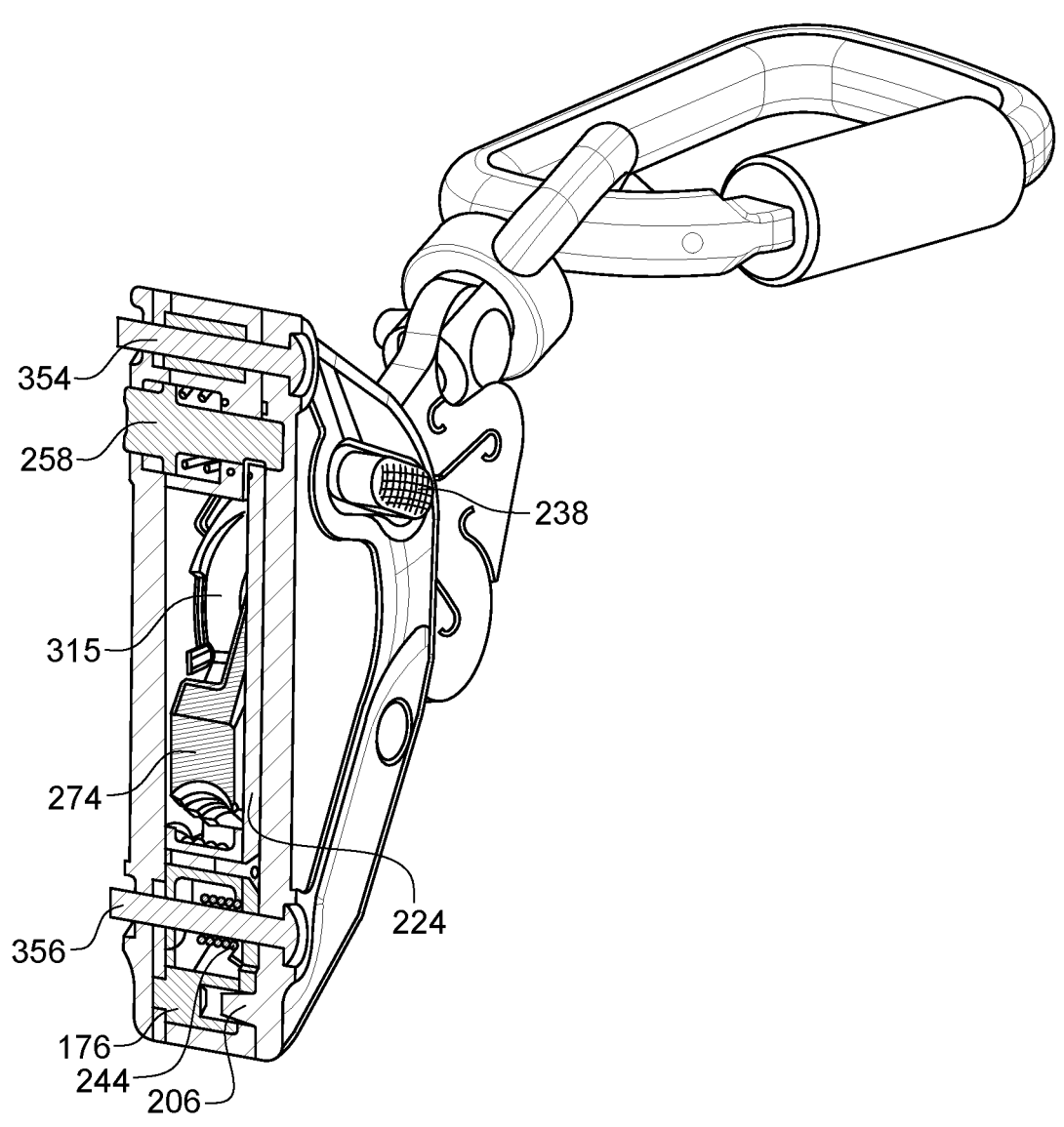
Figure 6:
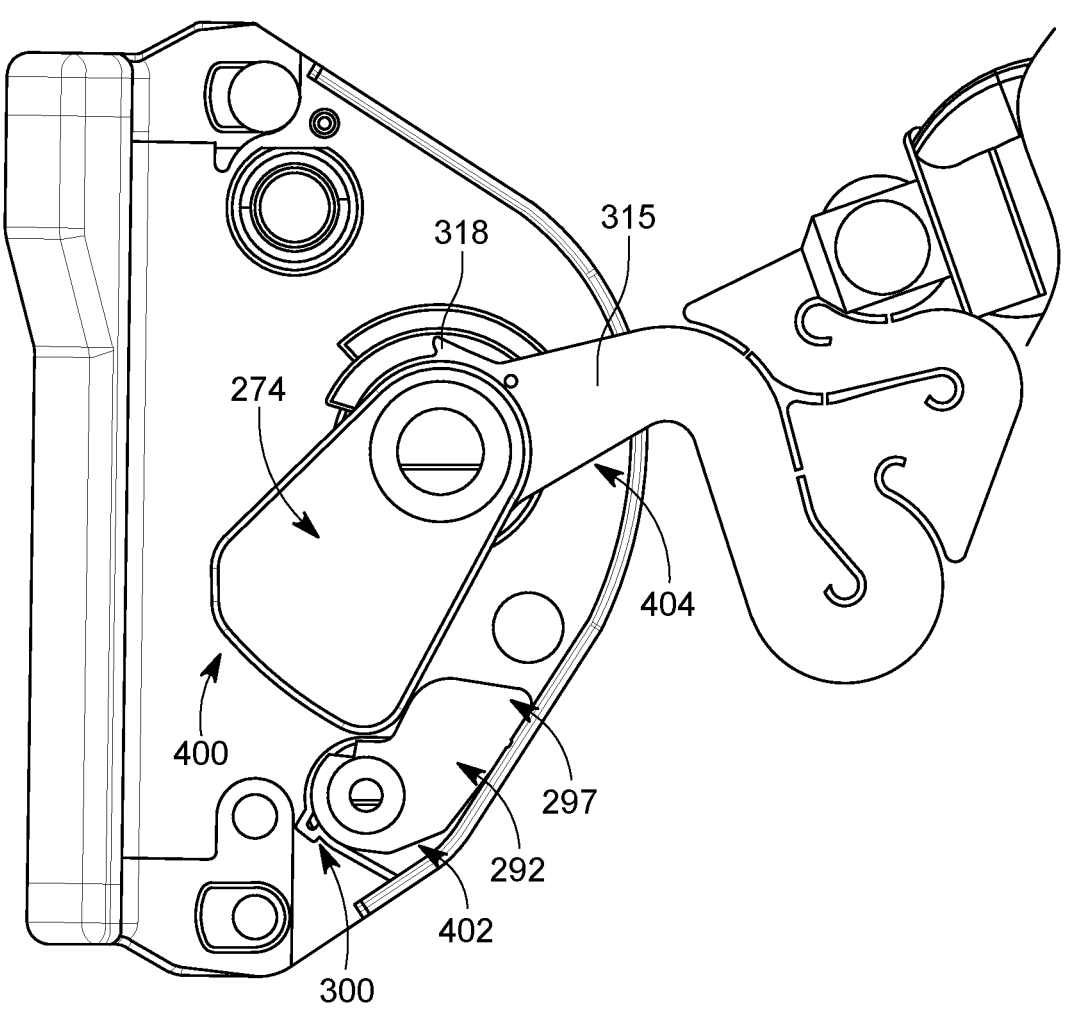
Figure 7:
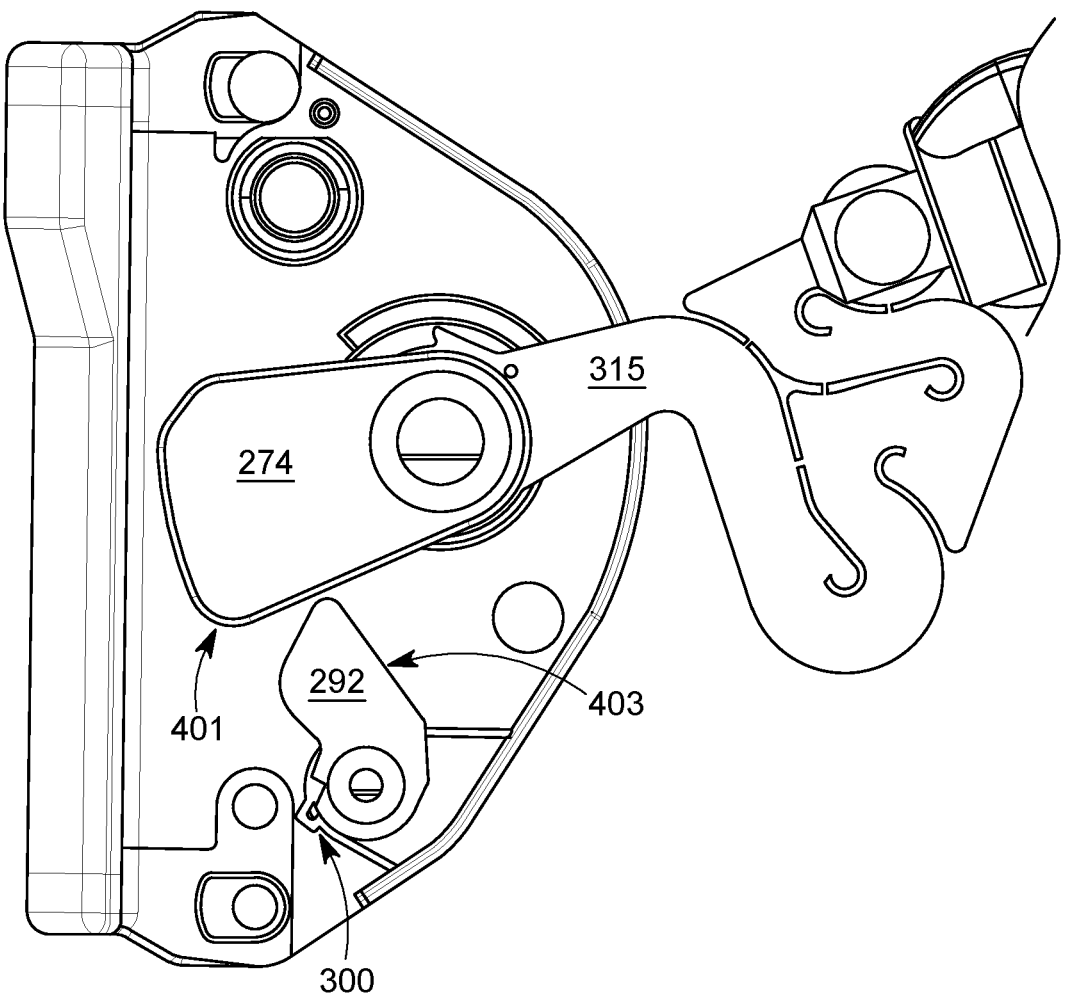
Figure 8:
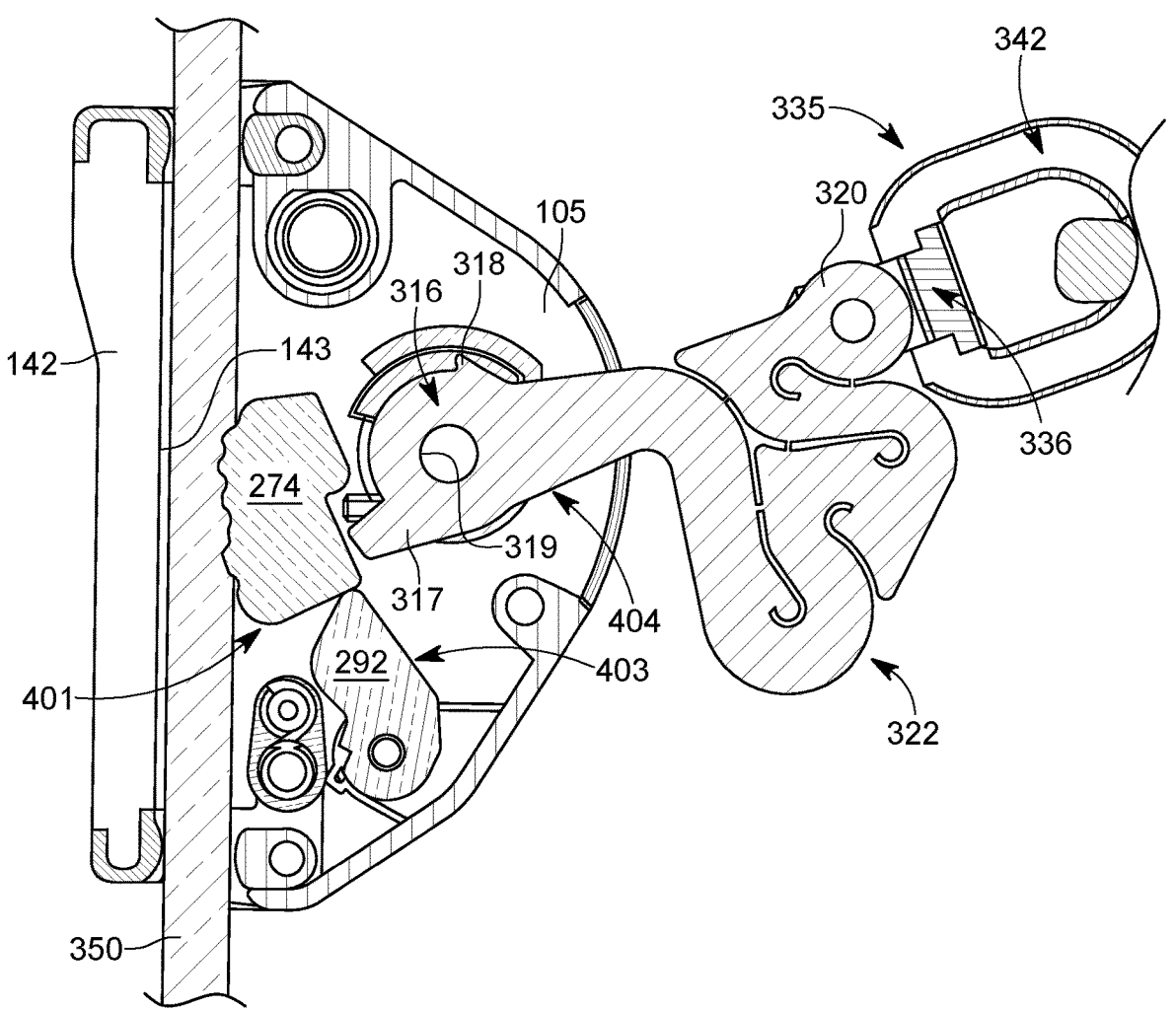
Figure 9:
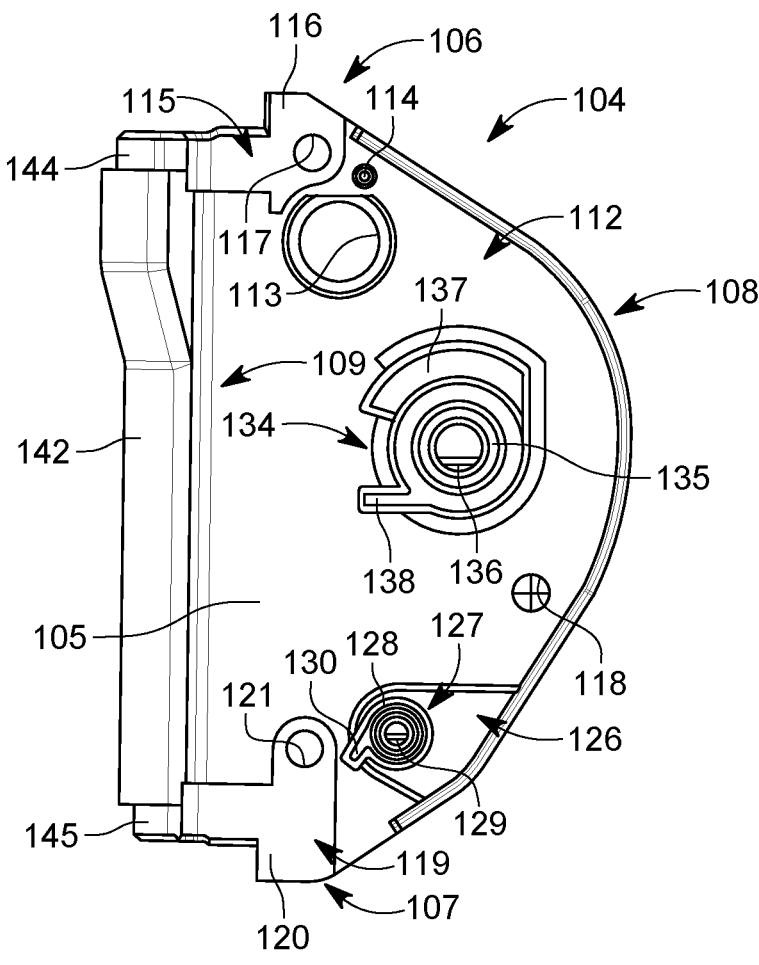
Figure 10:
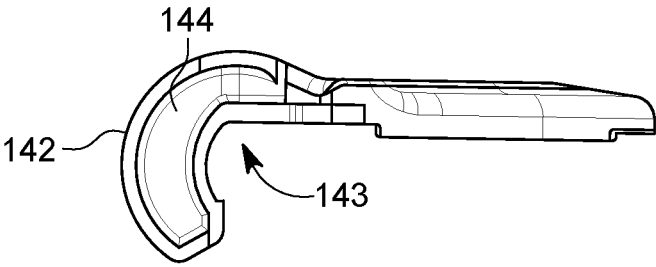
Figure 11:
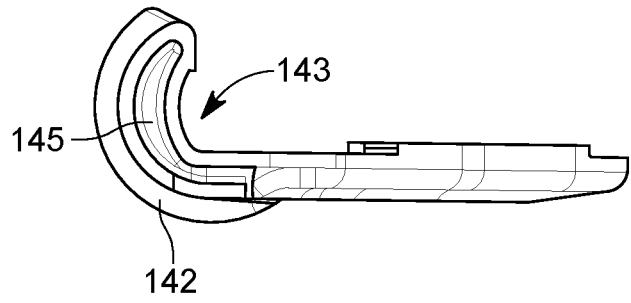
Figure 12:
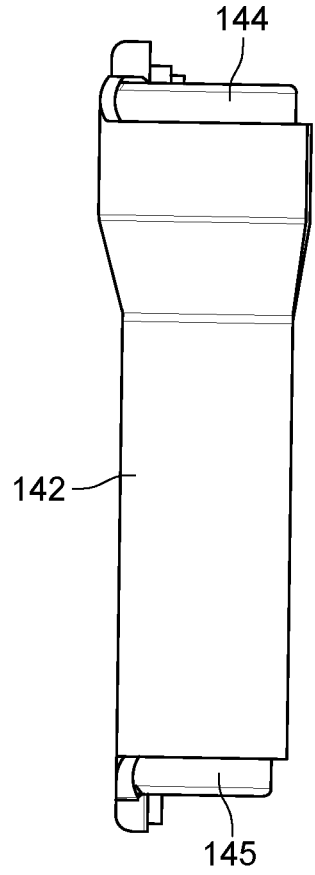
Figure 13:
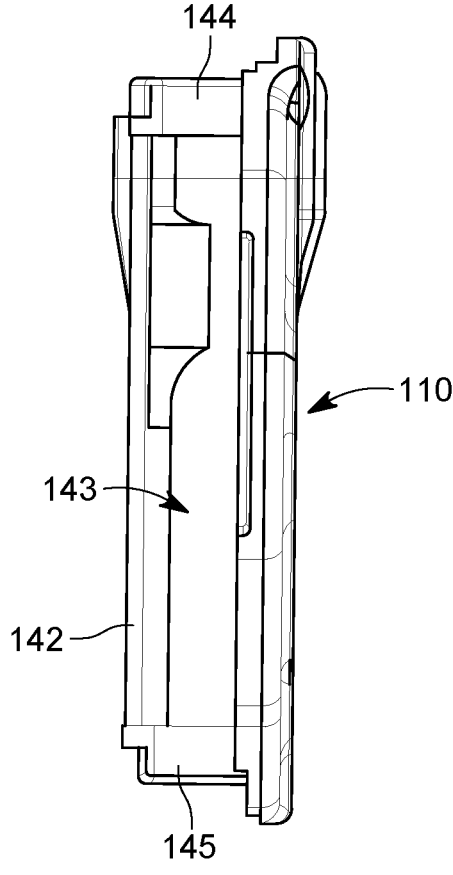
Figure 14:
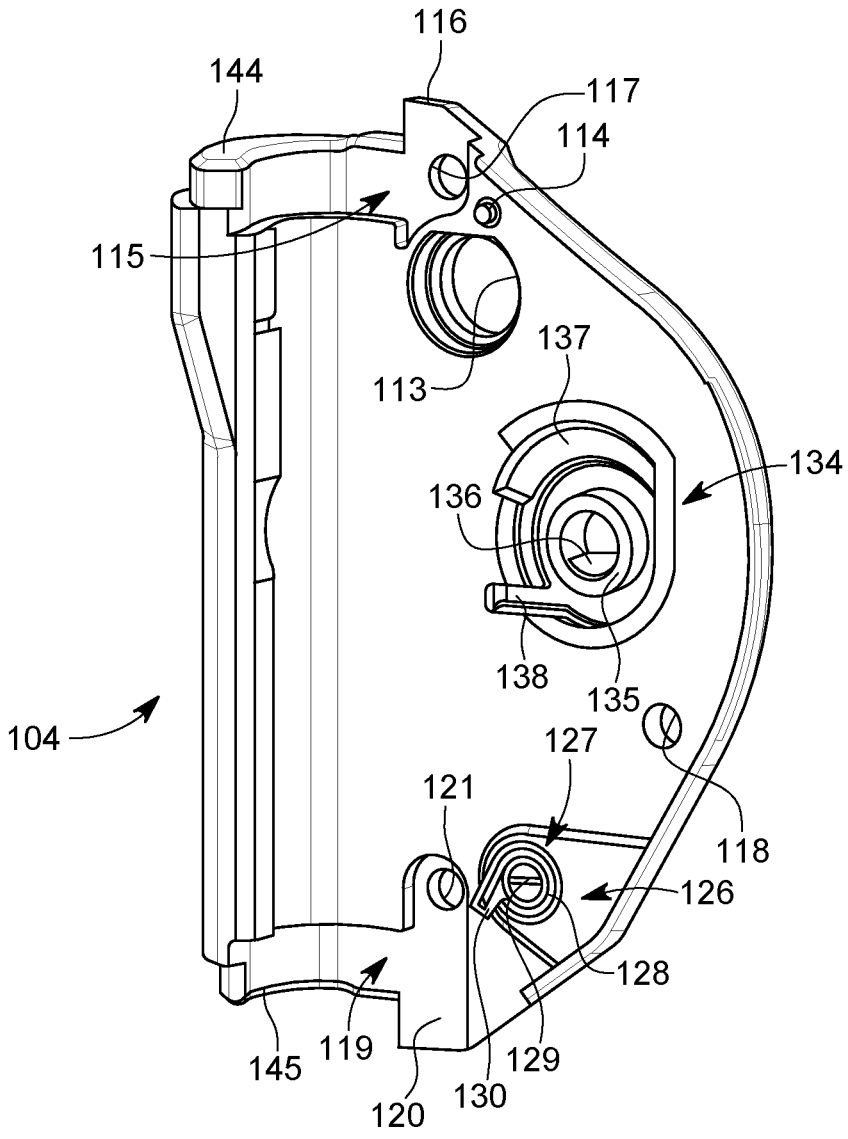
Figure 15:
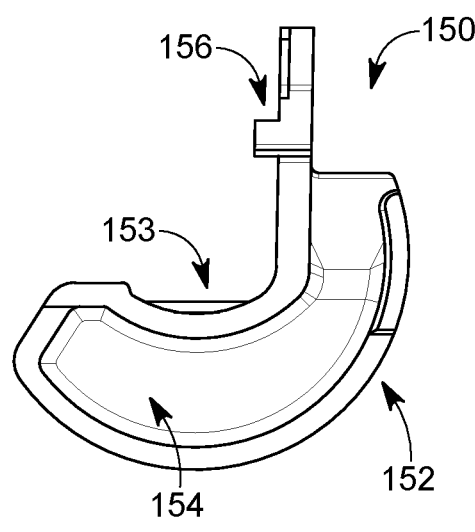
Figure 16:
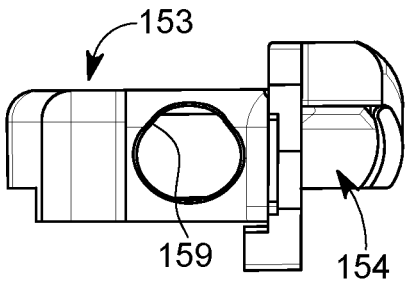
Figure 17:
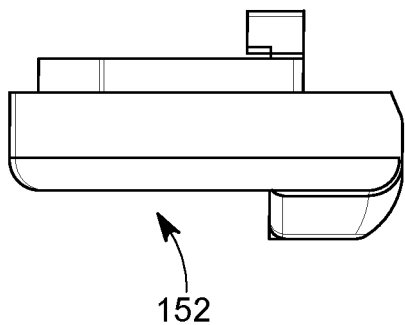
Figure 18:
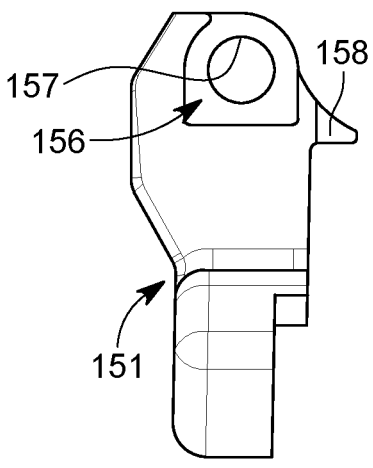
Figure 19:
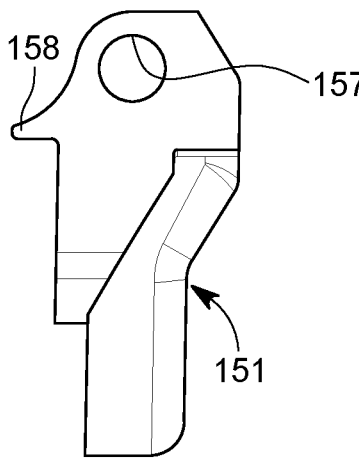
Figure 20:
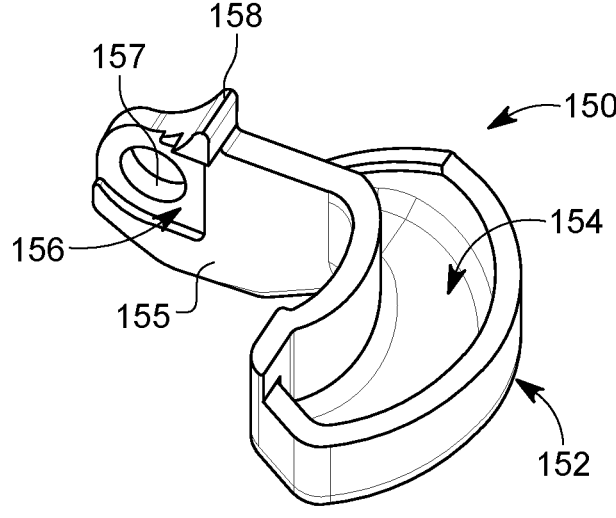
Figure 21:
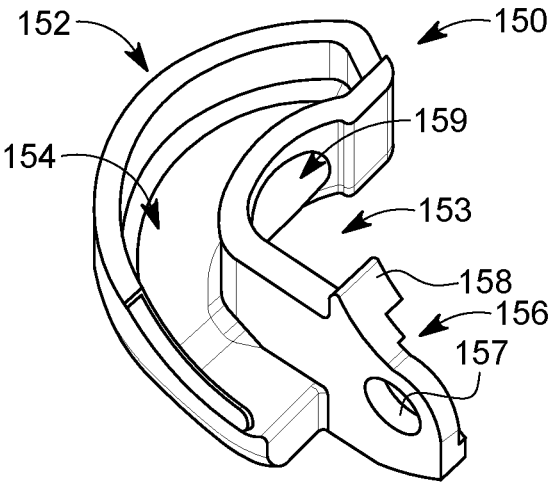
Figure 22:
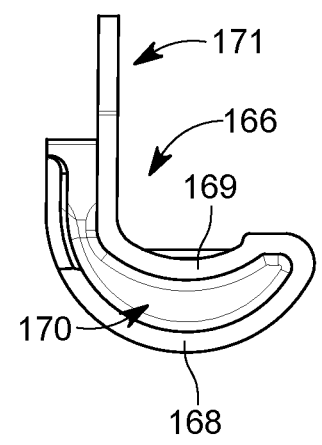
Figure 23:
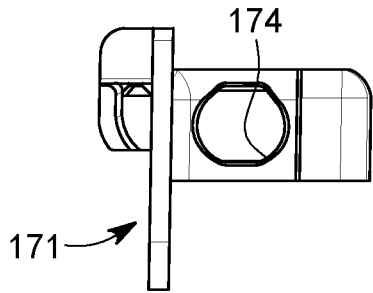
Figure 24:
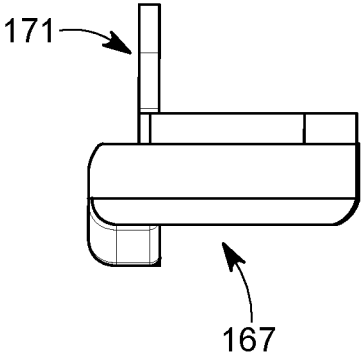
Figure 25:
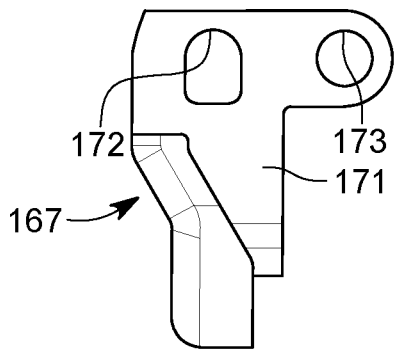
Figure 26:
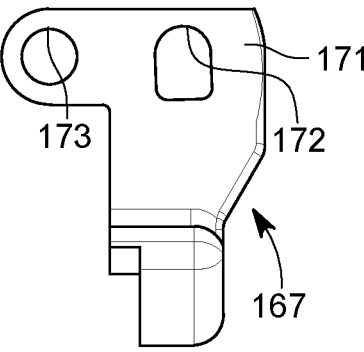
Figure 27:
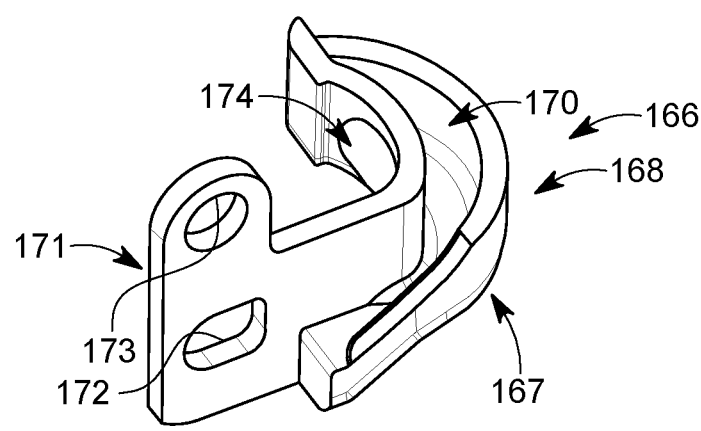
Figure 28:
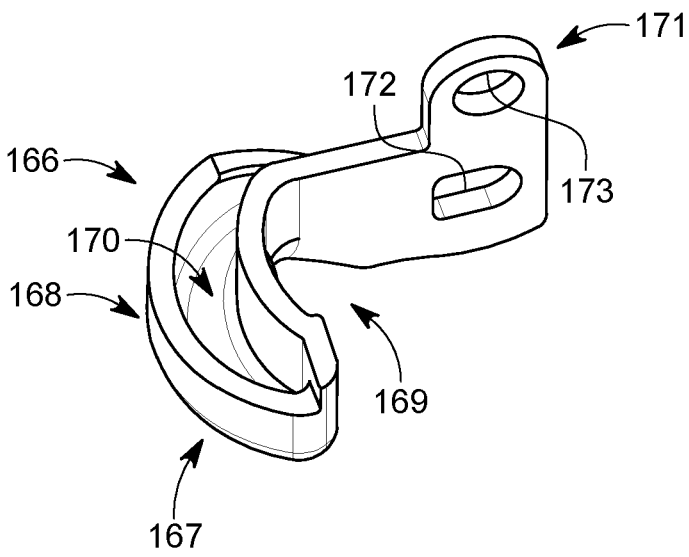
Figure 29:
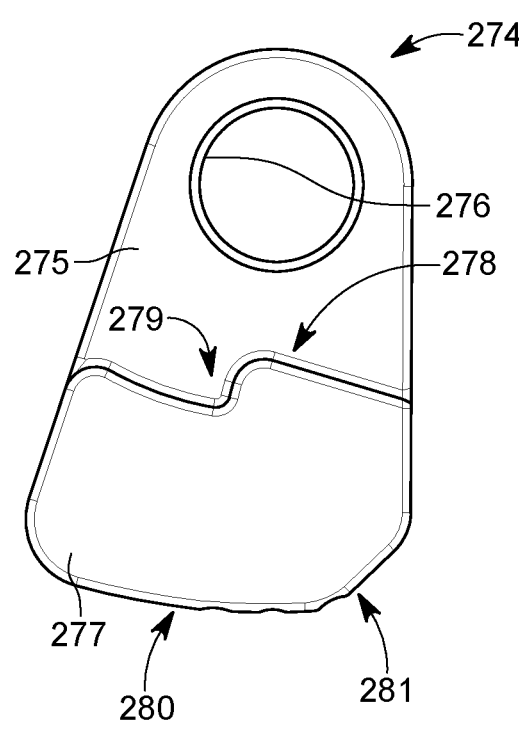
Figure 30:
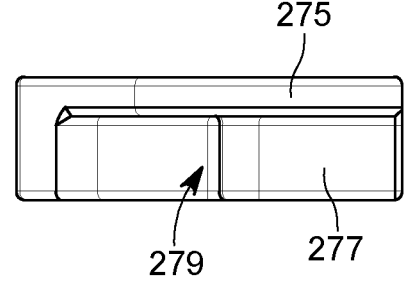
Figure 31:
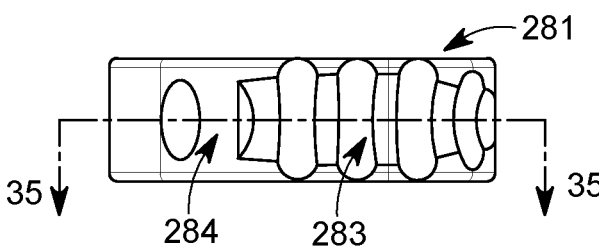
Figure 32:
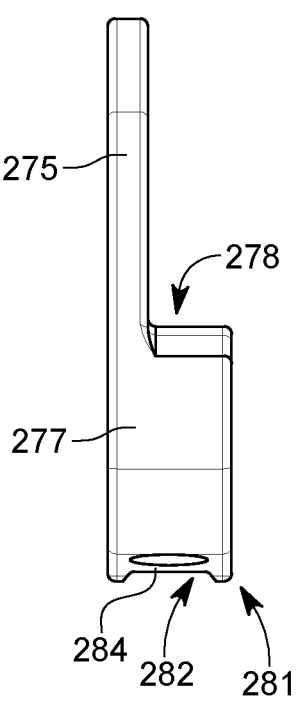

FIG. 2 is an exploded view of the assembly shown in FIG. 1;

FIG. 3 is a side view of the assembly shown in FIG. 1 with a gate in a locked gate position;

FIG. 4 is a side view of the assembly shown in FIG. 1 with the gate in an unlocked gate position;

FIG. 5 is a perspective cross section view of the assembly shown in FIG. 1 taken along the lines 5-5 in FIG. 3;

FIG. 6 is a side view of the assembly shown in FIG. 1 with a second body portion, a body spacer, and the gate removed to illustrate a locking mechanism in an unlocked position;

FIG. 7 is a side view of the assembly shown in FIG. 1 with the second body portion, the body spacer, and the gate removed to illustrate the locking mechanism in a locked position;

FIG. 8 is a side view of the assembly shown in FIG. 7 with a portion of a locking cam removed to illustrate another portion of the locking cam engaging a cable;

FIG. 9 is a side view of a first body portion of the cable sleeve shown in FIG. 1;

FIG. 10 is a top view of the first body portion shown in FIG. 9;

FIG. 11 is a bottom view of the first body portion shown in FIG. 9;

FIG. 12 is a front view of the first body portion shown in FIG. 9;

FIG. 13 is a rear view of the first body portion shown in FIG. 9;

FIG. 14 is a side perspective view of the first body portion shown in FIG. 9;

FIG. 15 is a bottom view of a first top surface bearing of the cable sleeve shown in FIG. 1;

FIG. 16 is a rear view of the first top surface bearing shown in FIG. 15;

FIG. 17 is a front view of the first top surface bearing shown in FIG. 15;

FIG. 18 is a side view of the first top surface bearing shown in FIG. 15;

FIG. 19 is a side view of the first top surface bearing shown in FIG. 15;

FIG. 20 is a bottom perspective view of the first top surface bearing shown in FIG. 15;

FIG. 21 is a bottom perspective view of the first top surface bearing shown in FIG. 15;

FIG. 22 is a top view of a first bottom surface bearing of the cable sleeve shown in FIG. 1;

FIG. 23 is a rear view of the first bottom surface bearing shown in FIG. 22;

FIG. 24 is a front view of the first bottom surface bearing shown in FIG. 22;

FIG. 25 is a side view of the first bottom surface bearing shown in FIG. 22;

FIG. 26 is a side view of the first bottom surface bearing shown in FIG. 22;

FIG. 27 is a top perspective view of the first bottom surface bearing shown in FIG. 22;

FIG. 28 is a top perspective view of the first bottom surface bearing shown in FIG. 22;

FIG. 29 is a side view of a locking cam of the cable sleeve shown in FIG. 1;

FIG. 30 is a top view of the locking cam shown in FIG. 29;

FIG. 31 is a bottom view of the locking cam shown in FIG. 29;

FIG. 32 is a rear view of the locking cam shown in FIG. 29;

4

Figure 33:
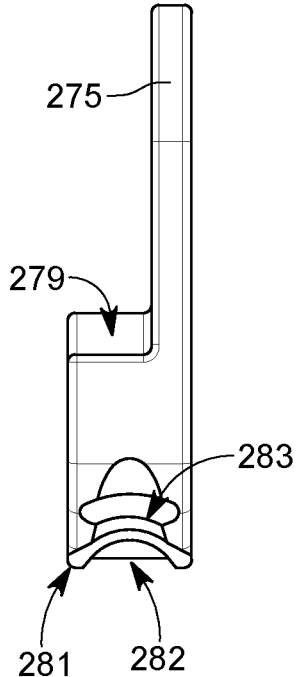
Figure 34:
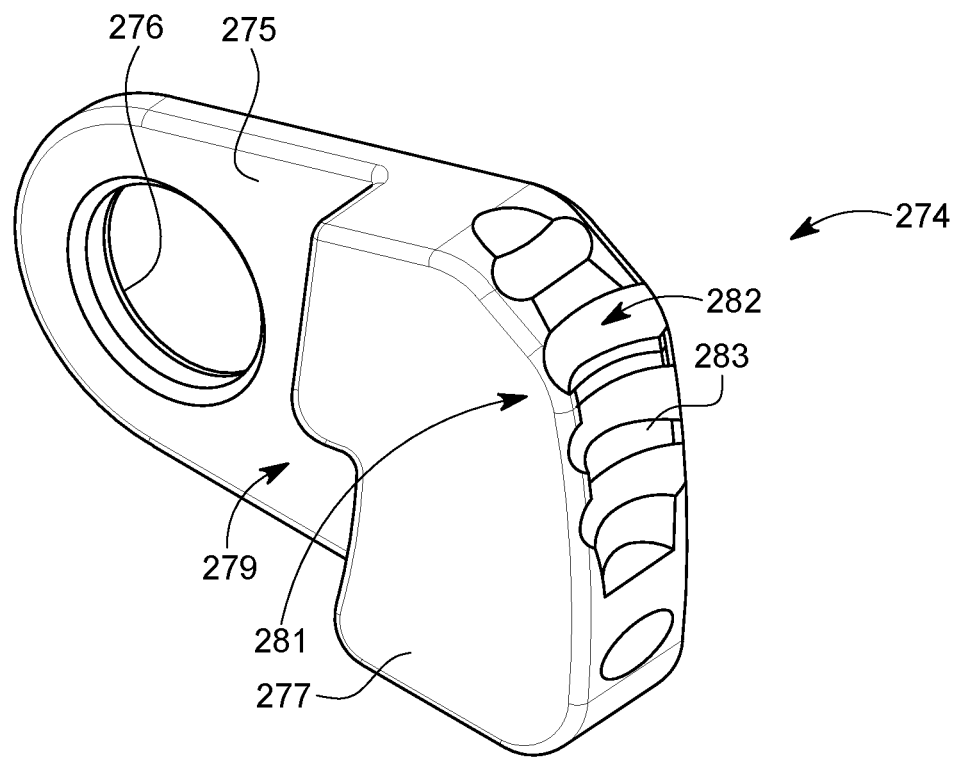
Figure 35:
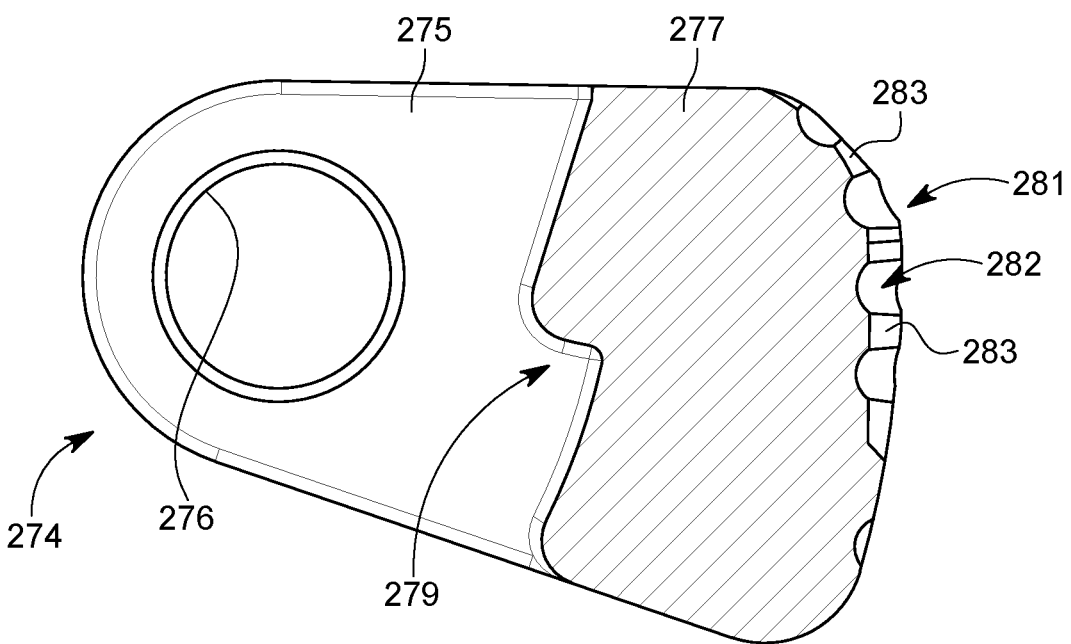
Figure 36:
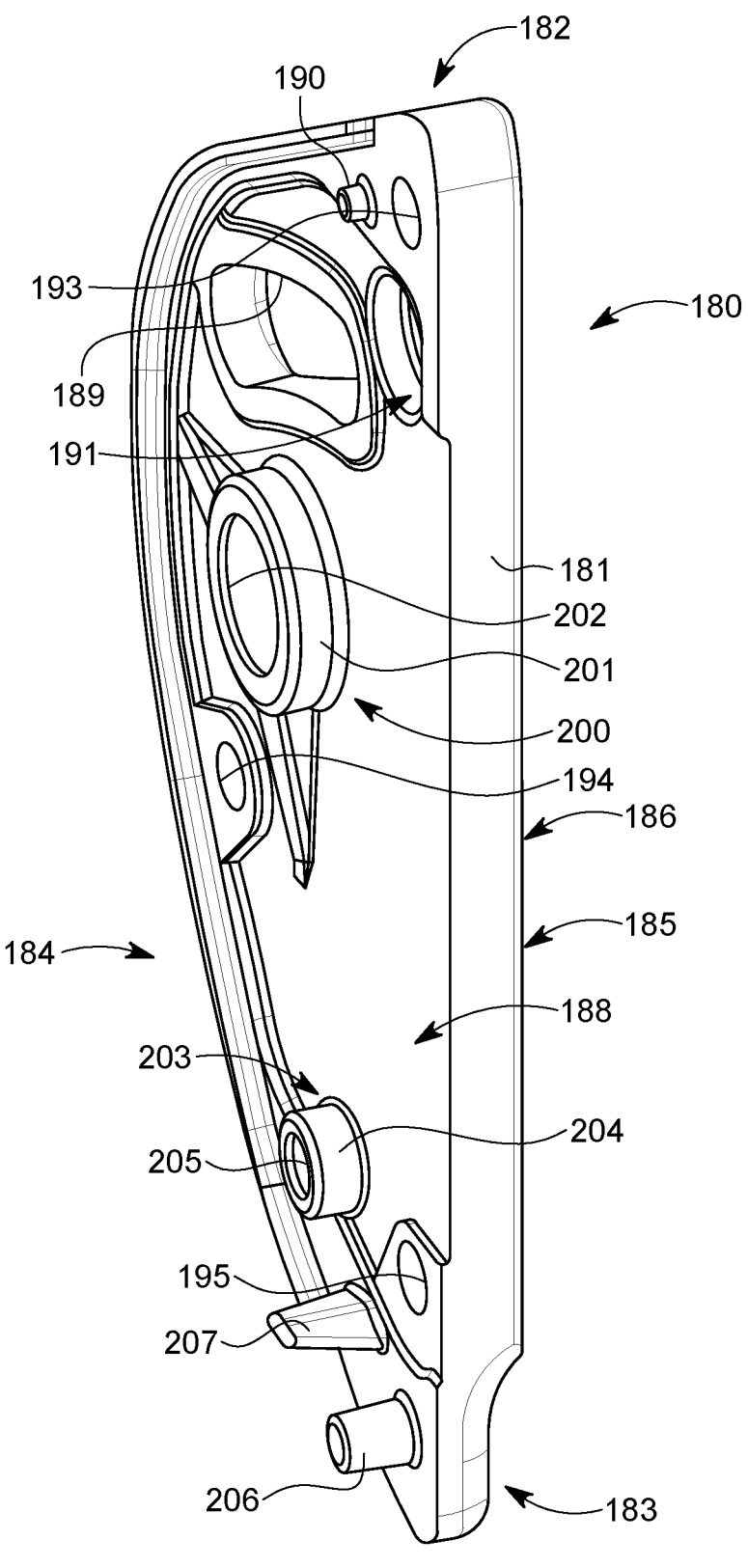
Figure 37:
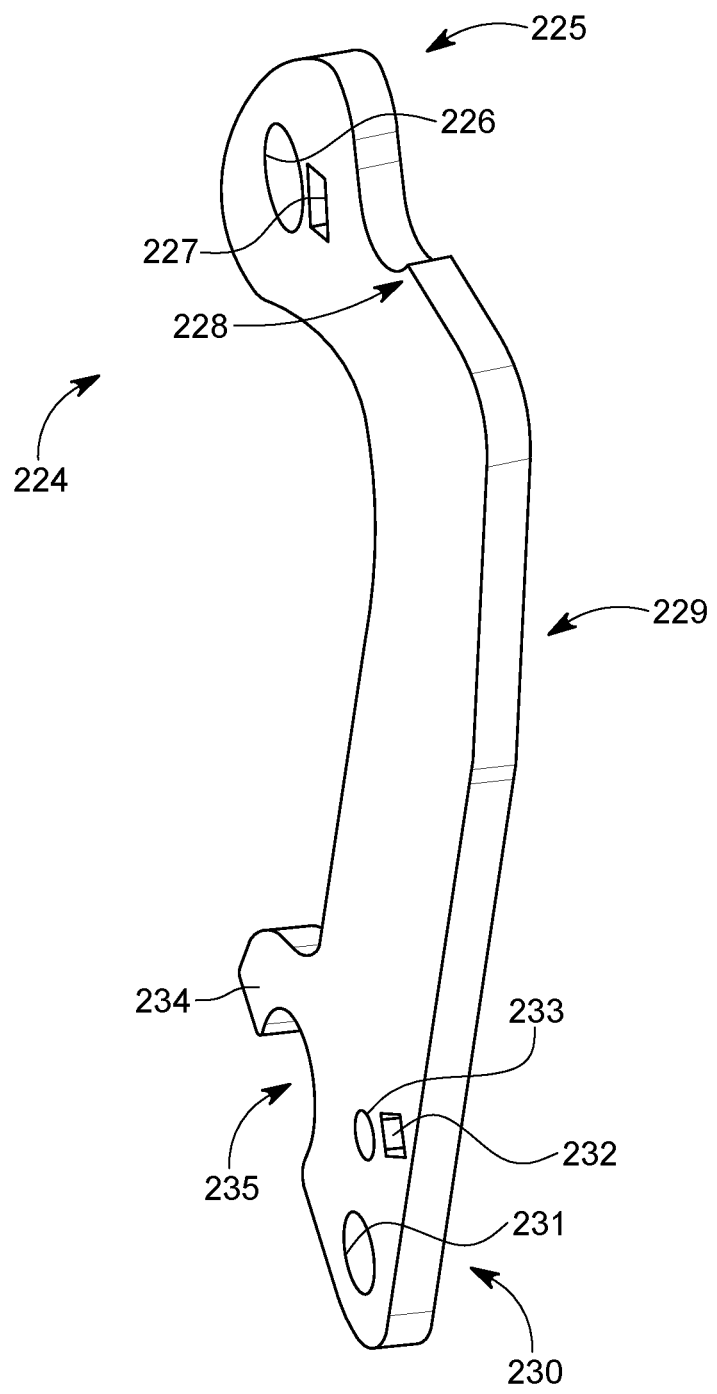
Figure 38:
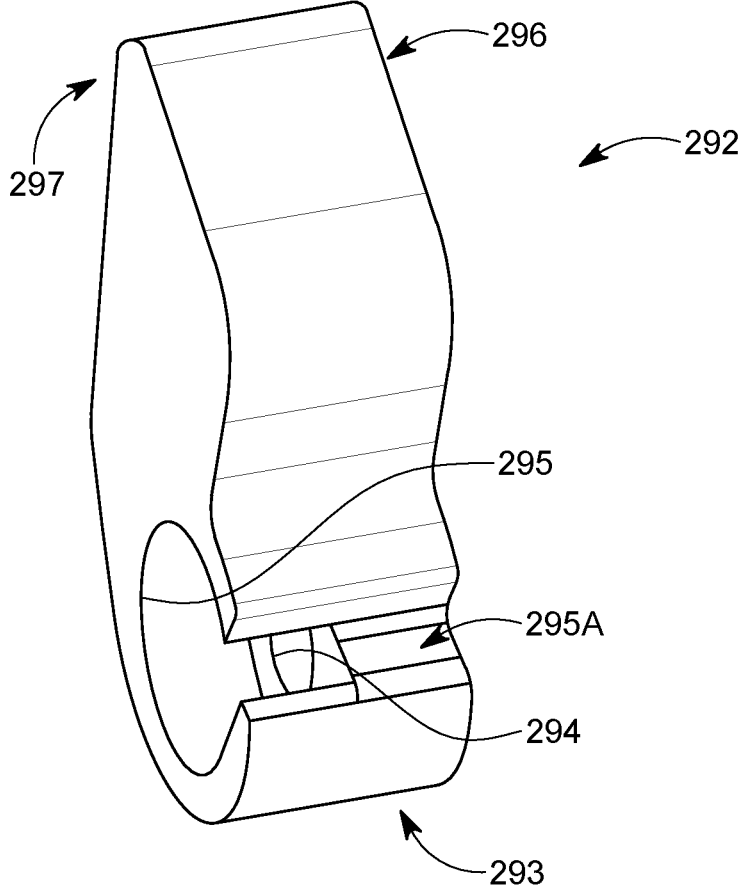

FIG. 33 is a front view of the locking cam shown in FIG. 29;

FIG. 34 is a perspective view of the locking cam shown in FIG. 29;

FIG. 35 is a cross section view of the locking cam shown in FIG. 29 taken along the lines 35-35 in FIG. 31;

FIG. 36 is a perspective view of a second body portion of the cable sleeve shown in FIG. 1;

FIG. 37 is a perspective view of a gate of the cable sleeve shown in FIG. 1; and FIG. 38 is a perspective view of a locking pawl of the cable sleeve shown in FIG. 1.

DETAILED DESCRIPTION

In the following detailed description, reference is made to the accompanying drawings, which form a part hereof, and in which is shown by way of illustration embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that other embodiments may be utilized and mechanical changes may be made without departing from the spirit and scope of the present disclosure. The following detailed description is, therefore, not to be taken in a limiting sense.

Embodiments of the disclosure generally provide a cable sleeve configured and arranged to slidably move along a cable during normal use and lock onto or engage the cable during a fall event. Normal use is when a user is climbing up or down a structure and the cable sleeve moves along the cable as the user moves. Should the user fall, the rate at which the cable sleeve moves along the cable increases thereby causing the cable sleeve to engage the cable to arrest the fall. Although the term cable is used throughout, it is understood that any suitable elongate member such as, but not limited to, a cable or a rope could be used. The elongate member preferably has a diameter of 8 to 10 cm but any suitable diameter can be used.

In one embodiment, the cable sleeve includes a housing, a locking cam, and a locking pawl. The housing has a cavity and an elongate member passage in fluid communication, and the elongate member passage is configured and arranged to slidably receive an elongate member. The locking cam is pivotally connected to the housing within the cavity and has a radial edge. The locking cam is configured and arranged to move from a first cam position to a second cam position, and the second cam position is configured and arranged to engage the elongate member received in the elongate member passage with the radial edge. The locking pawl is pivotally connected to the housing within the cavity and is configured and arranged to move from a first pawl position to a second pawl position. The second pawl position is configured and arranged to move the locking cam into the second cam position to engage the elongate member received in the elongate member passage. The locking pawl and the locking cam is a passive locking mechanism.

In one embodiment, the radial edge has a constant radius relative to a pivot connection between the locking cam and the housing.

In one embodiment, the locking pawl has a weighted side configured and arranged to keep the locking pawl in the first pawl position during normal use. Optionally, a pawl biasing member interconnects the locking pawl and the housing, and the pawl biasing member is configured and arranged to bias the locking pawl toward the second pawl position during a fall event.

In one embodiment, a locking arm is pivotally connected to the housing. The locking arm has a first end configured and arranged to be coupled to a safety harness and a second end configured and arranged to selectively engage the locking cam. The locking arm has a first arm position and a second arm position, and the second arm position is configured and arranged to engage the locking cam and move the locking cam into the second cam position to engage the elongate member received in the elongate member passage. The locking arm and the locking cam is an active locking mechanism.

In an example embodiment, illustrated in FIGS. 1-8, a cable sleeve 100 is operatively connected to a swivel connector 335 and a carabiner 348 for connection to a safety harness donned by a user. A lanyard (not shown) can be used to interconnect the carabiner 348 and the harness as is well known in the art. The swivel connector 335 includes a first swivel member 336 including a first extension 337 with an aperture 338 and a second extension 339 with an aperture 340. The first and second extensions 337 and 339 form a channel configured and arranged to receive a connector end 320 of a locking arm 315 having an aperture 321. The apertures 338, 321, and 340 align, and a swivel rivet 346 extends through the apertures 338, 321, and 340 to pivotally connect the locking arm 315 to the swivel connector 335. The first swivel member 336 is pivotally connected to a second swivel member 342. The second swivel member 342 has a base 343 with a cavity 344 configured and arranged to receive a portion of the first swivel member 336 interconnecting the extensions 337 and 339 so that the first swivel member 336 can pivot relative to the second swivel member 342. An eye 345 extends upward from the base 343 and provides an opening through which the carabiner 348 can extend to connect thereto. The locking arm 315 is part of the cable sleeve 100.

The cable sleeve 100 includes a housing 102 having a first body portion 104 and a second body portion 180 that form a cavity in fluid communication with an elongate member passage 143. As shown in FIGS. 9-14, the first body portion 104 includes a plate portion 105 and a side portion 142. The plate portion 105 has a top 106, a bottom 107, a first side 108, a second side 109, an outer surface 110, and an inner surface 112. The side portion 142 is operatively connected to the second side 109 and is curved to form the elongate member passage 143 along its inner surface and the inner surface 112 proximate the second side 109. The side portion 142 includes a top flange 144 and a bottom flange 145. Although the plate portion 105 and the side portion 142 are shown as an integral piece, it is recognized that they could be separate pieces operatively connected together. The plate portion 105 includes a top aperture 117 proximate the top 106, a side aperture 118 proximate the first side 108, and a bottom aperture 121 proximate the bottom 107. The apertures 117, 118, and 121 correspond with apertures in the second body portion 180 to connect the housing portions. Preferably, the housing portions are made of aluminum.

The inner surface 112 of the plate portion 105 includes a top recess 115 in which the top aperture 117 is positioned, and a top extension 116 extends upward proximate a top of the top aperture 117. A bore 113 is positioned below the top recess 115 proximate the top aperture 117, and a protrusion 114 is positioned beside the top recess 115 approximately between the top aperture 117 and the bore 113. The inner surface 112 also includes a bottom recess 119 in which the bottom aperture 121 is positioned, and a bottom extension 120 extends downward proximate a bottom of the bottom aperture 121.

A side recess 126 is positioned between the side aperture 118 and the bottom recess 119. A pawl shaft receiver 127 is positioned in the side recess 126 and includes a cylindrical portion 128. An inner stop 129 is positioned within the cavity formed by the cylindrical portion 128 and an outer stop 130 is positioned to extend tangentially outward from the cylindrical portion 128.

A cam shaft receiver 134 is positioned generally in the middle of the inner surface 112 of the plate portion 105. The cam shaft receiver 134 includes a cylindrical portion 135. An inner stop 136 is positioned within the cavity formed by the cylindrical portion 135, an upper outer stop 137 is generally an arc extending along a top portion of the cylindrical portion 135, and a lower outer stop 138 extends tangentially outward from the bottom of the cylindrical portion 128.

The top flange 144 is configured and arranged to mate with a first top surface bearing 150. The first top surface bearing 150 is shown in FIGS. 15-21. The first top surface bearing 150 includes a top 151, an outer side 152, and an inner side 153 that are curved and form bottom channel 154 in which the top flange 144 is received and that are configured and arranged to reduce wear on the cable extending through the elongate member passage 143 as the cable sleeve moves along the cable. The inner side 153 includes a cavity 159. An extension portion 155 extends outward from the inner side 153 and includes a recessed area 156 in which an aperture 157 is positioned. The aperture 157 aligns with the top aperture 117 of the plate portion 105. A protrusion 158 extends downward proximate the juncture of the inner side 153 and the extension portion 155.

The bottom flange 145 is configured and arranged to mate with a first bottom surface bearing 166. The first bottom surface bearing 166 is shown in FIGS. 22-28. The first bottom surface bearing 166 includes a bottom 167, an outer side 168, and an inner side 169 that are curved and form top channel 170 in which the bottom flange 145 is received and that are configured and arranged to reduce wear on the cable extending through the elongate member passage 143 as the cable sleeve moved along the cable. The inner side 169 includes a cavity 174. An extension portion 171 extends outward from the inner side 169 and includes a bottom aperture 172 and a top aperture 173. The top aperture 173 aligns with the bottom aperture 121 of the plate portion 105. The bottom aperture 172 receives a protrusion 177 of a second bottom surface bearing 176, which assists in retaining the cable in the elongate member passage 143 between the second bottom surface bearing 176 and the side portion 142.

The second body portion 180 is shown in FIG. 36. The second body portion 180 includes a plate portion 181 that is generally shaped like the plate portion 105 of the first body portion 104 and has a top 182, a bottom 183, a first side 184, a second side 185, an outer surface 186, and an inner surface 188. The plate portion 181 includes a top aperture 193, a side aperture 194, and a bottom aperture 195 that align respectively with the top aperture 117, the side aperture 118, and the bottom aperture 121 of the plate portion 105. The plate portion 181 includes an elongate opening or slot 189 proximate the top 182 and the first side 184. A protrusion 190 is generally aligned with the protrusion 114 of the plate portion 105, and a top recess 191 is generally aligned with the top bore 113 of the plate portion 105. Below the slot 189 is a cam shaft receiver 200 including a cylindrical flange 201 forming a cavity 202, and the cam shaft receiver 200 aligns with the cam shaft receiver 134. An inner stop (not shown), which is similar to the inner stop 136, is positioned in the cavity 202. A pawl shaft receiver 203 is positioned proximate the aperture 195 and the first side 184 and aligns with the pawl shaft receiver 127. The pawl shaft receiver 203 includes a cylindrical flange 204 forming a cavity 205. An inner stop (not shown), which is similar to inner stop 129, is positioned in the cavity 205. Proximate the bottom 183, below the aperture 195, is a protrusion 206, and a protrusion 207 is above the protrusion 206.

A body spacer 208, shown in FIG. 2, is configured and arranged to provide space or a cavity between the first body portion 104 and the second body portion 180. The body spacer 208 is generally C-shaped to form an opening in which a gate 224 moves from a closed position 411 to an open position 410. The body spacer 208 includes a base 209 proximate the top including a notched portion 210 open toward the first body portion 104 and the second side 185. An aperture 211 extends through the side in fluid communication with the cavity of the notched portion 210. There is also an aperture 212 proximate the top, and below the aperture 212 and the notched portion 210 is a bore 213. Extending generally downward from the base 209 is a connecting portion 215, which is offset toward the second body portion 180 to form an opening 221 between the connecting portion 215 and the first body portion 104. Proximate the middle of the connecting portion 215 is a side 216. A cylindrical portion interconnects the top of the side 216 and the connecting portion 215 and includes a bore 217. The distal end of the connecting portion 215 is proximate the middle of the side 216 and includes an aperture 218. The distal end of the side 216 includes an aperture 220, and there is a gap 219 between the portions forming apertures 218 and 220.

A gate assembly includes the gate 224, a gate slide button 238, a gate spring 244, a gate spring interface 248, a gate release button 258, and a gate release spring 264. The gate 224 is shown in FIG. 37 and includes a top portion 225, an intermediate portion 229, and a bottom portion 230. The intermediate portion 229 is configured and arranged to at least partially extend through the opening in the body spacer 208, the top portion 225 extends from the intermediate portion 229 toward the first side 184, and the bottom portion 230 extends downward from the intermediate portion 229 and includes an extension 234 forming a notch 235 proximate the first side 184. The distal end of the top portion 225 includes an aperture 226 and an aperture 227 is positioned inward from the aperture 226. Proximate the juncture of the intermediate portion 229 and the top portion 225 is a shoulder 228. The distal end of the bottom portion 230 includes an aperture 231, and apertures 232 and 233 are positioned above the aperture 231.

The gate spring interface 248 includes a base 249 with a flanged first end 250 from which a protrusion 252 extends and a flanged second end 253 with an aperture 254. The flanged first end 250 includes an aperture (not shown) proximate the protrusion 252.

The gate release button 258 includes a shaft 259 about which a spring 264 is positioned and a flange 262 interconnecting the shaft 259 and a button portion 261. An intermediate portion of the shaft 259 includes a notch 260.

A locking pawl 292 is shown in FIG. 38. The locking pawl 292 includes a pivot portion 293, which includes bores 294 and 295, and an engaging portion 296. A slot 295a is formed in the pivot portion 293. The engaging portion 296 is preferably a weighted side 297 configured and arranged to keep the locking pawl 292 in a desired position during use.

A locking cam 274 is shown in FIGS. 29-35. The surface facing the second body portion 180 is preferably flat, and the surface facing the first body portion 104 includes a cam portion 277 extending outward relative to a base 275. The base 275 includes an aperture 276 configured and arranged to receive the shaft 266. The cam portion 277 includes an inner surface 278 proximate the aperture 276, and one side of the inner surface 278 is closer to the aperture 276 than the other side thereby forming a notch 270 proximate the middle of the inner surface 278. The cam portion 277 provides a weighted portion of the locking cam 274. An outer surface 280, opposite the inner surface 278, includes a radial edge 281 forming a channel 282 with teeth 283 configured and arranged to receive and engage the cable. Preferably, the radial edge 281 and the channel 282 have a constant radius relative to a pivot connection between the locking cam 274 and the housing. Preferably, one side of the radial edge 281 proximate the elongate member passage 143 is chamfered to provide clearance when the locking cam 274 pivots toward the elongate member passage 143, and preferably the chamfered portion does not contact the cable positioned in the elongate member passage 143. Opposite the chamfered portion, the end of the radial edge 281 preferably includes a protrusion 284 that is configured and arranged to provide enhanced engaging with the cable, which ensures engagement with a smaller diameter cable. For example, if a 10 cm cable is used, the flat portion of the channel 282 proximate the chamfered portion will engage the cable, and if an 8 cm cable is used, the channel 282 proximate and possibly including the protrusion 284 will engage the cable. Therefore, the channel 282 includes varying types of engaging surfaces having differing angles of engagement.

A cam shaft 266, shown in FIG. 2, includes a first end 267 with notch 268 and a second end 269 with notch 270. The first end 267 has a larger diameter than the second end 269 forming a shoulder 271.

The locking arm 315 includes a cam end 316 and a connector end 320. The cam end 316 includes a protrusion 317 at its distal end, a protrusion 318 at its top, and an aperture 319. The connector end 320 includes an aperture 321 configured and arranged to connect to the user's safety harness, such as with swivel connector 335 and carabiner 348. Optionally, an energy absorber portion 322 interconnects the cam end 316 and the connector end 320.

To assembly the cable sleeve 100, the components can be assembled in any suitable order. The body spacer 208 is operatively connected to the second body portion 180 by aligning the apertures 193 and 211 and by inserting protrusion 206 into aperture 220. The first end 267 of the cam shaft 266 is inserted into the cam receiver 200 so that the notch 268 abuts the stop (not shown) within the cavity 202 to prevent rotation of the cam shaft 266. The locking cam sleeve bearing 286 is positioned on the cam shaft 266, with the second end 269 extending through the aperture 289, so that the flange 288 abuts the shoulder 271. Then, the locking cam 274 is positioned on the cam shaft 266, with the second end 269 of the cam shaft 266 and the base 287 of the locking cam sleeve bearing 286 extending through the aperture 276 of the locking cam 274.

To assemble the gate assembly, the gate slide button 238 includes a bore 239 that aligns with the aperture 226 of the gate 224 and a protrusion 240 configured and arranged to extend into the aperture 227 of the gate 224. A fastener 242 extends through the aperture 226 and into the bore 239 to secure the gate slide button 238 to the gate 224. The protrusion 252 of the gate spring interface 248 is configured and arranged to extend into the aperture 232 of the gate 224. The gate spring 244 includes a first end 245 configured and arranged to engage a fastener 256 extending through the aperture 233 of the gate 224 and into the aperture (not shown) in the gate spring interface 248. A second end 245 of the gate spring 244 is configured and arranged to engage 207 thereby placing a biasing force on the gate 224 toward the closed position 411.

The gate release spring 264 is positioned on the shaft 259 of the gate release button 258, and the gate release spring 264 and the shaft 259 are positioned in the bore 213. The gate release spring 264 biases the gate release button 258 so that the shaft 259 between the notch 260 and the distal end contacts the shoulder 228 of the gate 224.

The second end 269 of the cam shaft 266 is inserted through an aperture 289 in a base 287 of a locking cam sleeve bearing 286 so that a flange 288 extending outward from the base 287 contacts the shoulder 271. The second end 269 of the cam shaft 266 is then inserted through the aperture 276 of the locking cam 274 so the locking cam base 275 contacts the locking cam sleeve bearing base 287. The second end 269 of the cam shaft 266 is then inserted through the aperture 319 of the locking arm 315, through the aperture in spring 330, and through the bore 329 of the locking cam sleeve bearing 326. The second end 332 of the spring is positioned on the locking arm 315 against the protrusion 318 and the first end 331 is operatively connected to the first body portion 104 to bias the locking arm 315 in the first, unlocked position 404. A locking cam sleeve bearing 326 includes a base 327 through which a bore 329 extends and a flange 328 extends outward from an end of the shaft 327. The second end 269 extends through the bore 329 and the flange 328 is positioned proximate the cam end 316. The distal end of the first end 267 includes a notch 268, and the distal end of the second end 269 includes a notch 270. The notches 268 and 270 correspond with the stops in the cam shaft receivers 134 and 200 to prevent rotation of the cam shaft 266.

A pawl biasing member 300 is positioned in the bore 295 so that its second end 302 extends into the slot 295a. A pawl shaft 304 is inserted through a bore 312 in a base 311 of the pawl sleeve bearing 310 and then through the bore 294 so that a flange 313 extending from the base 311 abuts the pawl 292. A second end 307 of the pawl shaft 304 has a notch 308 and is positioned in the pawl shaft receiver 203 with the notch 308 abutting the stop (not shown) so that the pawl shaft 304 does not rotate in the housing. A first end 301 of the pawl biasing member 300 is operatively connected to the housing 102 so that the pawl biasing member 300 selectively places a biasing force on the pawl 292. A first end 305 of the pawl shaft 304 has a notch 306 similarly received in the pawl shaft receiver 127 when assembled.

The first and second top and bottom bearings 150, 162, 166, and 176 are positioned on the first body portion 104. The second top surface bearing 162 includes a protrusion that mates with the first top bearing 150 for proper orientation and bore 163 aligns with top aperture 117. The second bottom bearing 176 includes protrusion 177 that fits in bottom aperture 172 of the first bottom surface bearing 166 and includes a bore (not shown) that receives protrusion 206 of the second body portion 180. The first body portion 104 is aligned with the second body portion 180 so that the button portion 261 of the gate release button 258 extends through the top bore 113, the second end 269 of the cam shaft 266 extends into the cam shaft receiver 134, and the first end 305 of the pawl shaft 304 extends into the pawl shaft receiver 127. The protrusion 158 of the top surface bearing 150 extends into the slot 212a of the body spacer 208 to keep the top surface bearing 150 from rotating. In addition, the spring 330 is positioned about the cylindrical portion 135 of the cam shaft receiver and the first end 331 of the spring 330 is positioned in the lower outer stop 138. The spring 300 is positioned about the cylindrical portion 128 of the pawl shaft receiver 127 and the first end 301 of the spring 300 is positioned in the outer stop 130. Rivet 354 is positioned through top aperture 193 of second body portion 180, aperture 157 of first top surface bearing 150, bore 163, and top aperture 117 of first body portion 104. Rivet 355 is positioned through side aperture 194 of second body portion 180, bore 217 of body spacer 208, and side aperture 118 of first body portion 104. Rivet 356 is positioned through bottom aperture 195 of second body portion 180, gap 219 in the body spacer 208, aperture 231 of gate 224, a bore of spring 244, aperture 254 of the gate spring interface 248, aperture 173 of the first bottom surface bearing 166, and bottom aperture 121 of the first body portion 104.

The connector end 320 along with the optional energy absorber portion 322 extend through the opening between the body spacer 208 and the first body portion 104 and is operatively connected to the swivel connector 335 with swivel rivet 346 as is well known in the art.

In operation, during normal use, a cable anchored to a support structure that is a component of a vertical safety system is positioned within the elongate member passage 143 by pressing the gate release button 258, which compresses the gate release spring 264, thereby moving the gate release button 258 from a locked position to an unlocked position to position the notch 260 proximate the gate 224. With the notch 260 positioned proximate the gate 224, the shaft 259 no longer prevents the gate 224 from pivoting about rivet 356. The gate slide button 238 can then be moved within slot 189, overcoming the biasing force of spring 244, to pivot the gate 224 from a closed position 411 (FIGS. 3 and 5) to an open position 410 (FIG. 4). With the gate 224 in the open position 410, the cable can be positioned within the elongate member passage 143. When the gate slide button 238 and the gate release button 258 are released, the respective springs 244 and 264 place biasing forces on the gate 224 and the gate release button 258 to move them back into their closed and locked positions. The user connects to the cable sleeve 100 and is then able to safely climb up and/or down a structure with the cable sleeve 100 moving along the cable. As shown in FIG. 6, the locking arm 315, the locking pawl 292, and the locking cam 274 are in their open or unlocked positions, their respective first positions 404, 402, and 400. The locking arm 315 is biased in this position by the spring 330 and the locking pawl 292 is biased in this position by its weighted side 297 proximate a distal end of the engaging portion 296. A combination of the weighted side 297 and gravity during normal use holds the locking pawl 292 in this position.

Should a fall occur, the locking arm 315 pivots about cam shaft 266 from a first arm position 404 to a second arm position (not shown), overcoming the bias of spring 330, such that the connector end 320 moves downward and the cam end 316 moves upward thereby contacting the locking cam 274 and moving it from a first cam position 400 to a second cam position 401 in which it compresses the cable and pushes it against the side portion 142 to stop the cable sleeve from moving along the cable. Because the locking arm 315 moves from the first arm position 404 into the second arm position as the user moves at an increased rate downward, it is an active locking mechanism. In addition, the locking pawl 292 moves from its first pawl position 402 to its second pawl position 403 to also contact the locking cam 274 and move it. The locking pawl's weighted side 297 is configured and arranged to keep the locking pawl 292 in a first pawl position 402 during normal use with the assistance of gravity. Optionally, a pawl biasing member 300 interconnects the locking pawl 292 and the housing to bias the locking pawl 292 toward a second pawl position 403 during a fall event. Preferably, the pawl biasing member 300 does not place a biasing force on the locking pawl 292 when the locking pawl 292 is in the first pawl position 402 and, as the locking pawl 292 moves from the first pawl position 402 toward the second pawl position 403, due to the increased rate of movement along the cable, the pawl biasing member 300 places a biasing force on the locking pawl 292 toward the second position 403 during a fall event. Because the locking pawl 292 moves from the first pawl position 402 into the second pawl position 403 due to the increased rate the cable sleeve moves along the cable, it is a passive locking mechanism.

If the user grabs the locking arm 315 and prevents it from pivoting to contact the locking cam 274, the locking pawl 292 will still pivot to contact the locking cam 274, which will then engage the cable. This is illustrated in FIGS. 7 and 8 with FIG. 8 illustrating the locking cam 274 engaging a cable 350. Therefore, should a fall occur, at least one of the locking pawl 292 and the locking arm 315 engages the locking cam 274.

The fall rate at which the locking pawl starts to move from its weight biased first pawl position toward its second pawl position is approximately 20 ft/sec^2 Generally, the locking pawl relies on acceleration and, in one embodiment, at approximately 20 ft/sec^2 the force on the pawl biasing member is sufficient to overcome the force of gravity and the pawl biasing member starts to bias the locking pawl. For reference, an object that falls in a vacuum accelerates at 32.2 ft/sec^2. Therefore, at the onset of a fall, the pawl biasing member is actively biasing the locking pawl.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A cable sleeve, comprising:
a housing having a cavity and an elongate member passage, the cavity and the elongate member passage being in fluid communication, the elongate member passage configured and arranged to slidably receive an elongate member;
a locking cam pivotally connected to the housing within the cavity, the locking cam having a radial edge with a constant radius relative to a pivot connection between the locking cam and the housing, the locking cam configured and arranged to move from a first cam position to a second cam position, the second cam position configured and arranged to engage the elongate member received in the elongate member passage with the radial edge; and
a locking pawl pivotally connected to the housing within the cavity, the locking pawl configured and arranged to move from a first pawl position to a second pawl position, the second pawl position configured and arranged to move the locking cam into the second cam position to engage the elongate member received in the elongate member passage; and
a locking arm pivotally connected to the housing, the locking arm having a first end configured and arranged to be coupled to a safety harness and a second end configured and arranged to selectively engage the locking cam, the locking arm having a first arm position and a second arm position, the second arm position configured and arranged to engage the looking cam and move the locking cam into the second cam position to engage the elongate member received in the elongate member passage.

2. The cable sleeve of claim 1, wherein the locking pawl has a weighted side configured and arranged to keep the locking pawl in the first pawl position during normal use.

3. The cable sleeve of claim 2, further comprising a pawl biasing member interconnecting the locking pawl and the housing, the pawl biasing member configured and arranged to bias the locking pawl toward the second pawl position during a fall event.

4. The cable sleeve of claim 3, wherein the locking pawl is weight biased into the first pawl position in which the pawl biasing member does not place a biasing force on the locking pawl during normal use.

5. The cable sleeve of claim 4, wherein during a fall event the locking pawl moves from the first pawl position toward the second pawl position and the pawl biasing member then exerts a biasing force on the locking pawl to bias the locking pawl toward the second pawl position.

6. The cable sleeve of claim 1, wherein the locking cam engages the elongate member when at least one of the locking pawl and the locking arm engages the locking cam.

7. The cable sleeve of claim 1, wherein the locking arm includes an energy absorber.

8. The cable sleeve of claim 1, wherein the elongate member is selected from the group consisting of a cable and a rope.

9. The cable sleeve of claim 8, wherein the elongate member has a diameter from 8 to 10 cm.

10. A cable sleeve, comprising:
a housing having a cavity and an elongate member passage, the cavity and the elongate member passage being in fluid communication, the elongate member passage configured and arranged to slidably receive an elongate member;
a locking cam pivotally connected to the housing within the cavity, the locking cam configured and arranged to move from a first cam position to a second cam position, the second cam position configured and arranged to engage the elongate member received in the elongate member passage with a radial edge;
a locking pawl pivotally connected to the housing within the cavity, the locking pawl configured and arranged to move from a first pawl position to a second pawl position, the locking pawl having a weighted side configured and arranged to keep the locking pawl in the first pawl position during normal use, the second pawl position configured and arranged to engage the locking cam and move the locking cam toward the elongate member passage against the elongate member during a fall event; and further comprising a locking arm pivotally connected to the housing, the locking arm having a first end configured and arranged to be coupled to a safety harness and a second end configured and arranged to selectively engage the locking cam, the locking arm having a first arm position and a second arm position second a position configured and arranged to engage the locking cam and move the locking cam into the second cam position to engage the elongate member received in the elongate member passage.

11. The cable sleeve of claim 10, wherein the radial edge has a constant radius relative to a pivot connection between the locking cam and the housing.

12. The cable sleeve of claim 10, further comprising a pawl biasing member interconnecting the locking pawl and the housing, the pawl biasing member configured and arranged to bias the locking pawl toward the second pawl position during a fall event.

13. The cable sleeve of claim 12, wherein the locking pawl is weight biased into the first pawl position in which the pawl biasing member does not place a biasing force on the locking pawl during normal use.

14. The cable sleeve of claim 13, wherein during a fall event the locking pawl moves from the first pawl position toward the second pawl position and the pawl biasing member then exerts a biasing force on the locking pawl to bias the locking pawl toward the second pawl position.

15. The cable sleeve of claim 10, wherein the locking cam engages the elongate member when at least one of the locking pawl and the locking arm engages the locking cam.

16. A cable sleeve, comprising:

a housing having a cavity and an elongate member passage, the cavity and the elongate member passage being in fluid communication; the elongate member passage configured and arranged to slidably receive an elongate member;

a locking cam pivotally connected to the housing within the cavity, the locking cam configured and arranged to move from a first cam position to a second cam position, the second cam position configured and arranged to engage the elongate member received in the elongate member passage with a radial edge;

a passive locking mechanism, comprising:

a locking pawl pivotally connected to the housing within the cavity, the locking pawl configured and arranged to move from a first pawl position to a second pawl position, the locking pawl having a weighted side configured and arranged to keep the locking pawl in the first pawl position during normal use, the second pawl position configured and arranged to engage the locking cam and move the locking cam toward the elongate member passage against the elongate member during a fall event;

an active locking mechanism, comprising:

a locking arm pivotally connected to the housing, the locking arm having a first end configured and arranged to be coupled to a safety harness and a second end configured and arranged to selectively engage the locking cam, the locking arm having a first arm position and a second arm position, the second arm position configured and arranged to engage the locking cam and move the locking cam into the second cam position to engage the elongate member received in the elongate member passage;

wherein the locking cam engages the elongate member when at least one of the locking pawl and the locking arm engages the locking cam.

17. The cable sleeve of claim 16, further comprising a pawl biasing member interconnecting the locking pawl and the housing, the pawl biasing member configured and arranged to bias the locking pawl toward the second pawl position during a fall event.

18. The cable sleeve of claim 17, wherein the locking pawl is weight biased into the first pawl position in which the pawl biasing member does not place a biasing force on the locking pawl during normal use, wherein during a fall event the locking pawl moves from the first pawl position toward the second pawl position and the pawl biasing member then exerts a biasing force on the locking pawl to bias the locking pawl toward the second pawl position.

* * * * *